United States Patent Office 3,048,532
Patented Aug. 7, 1962

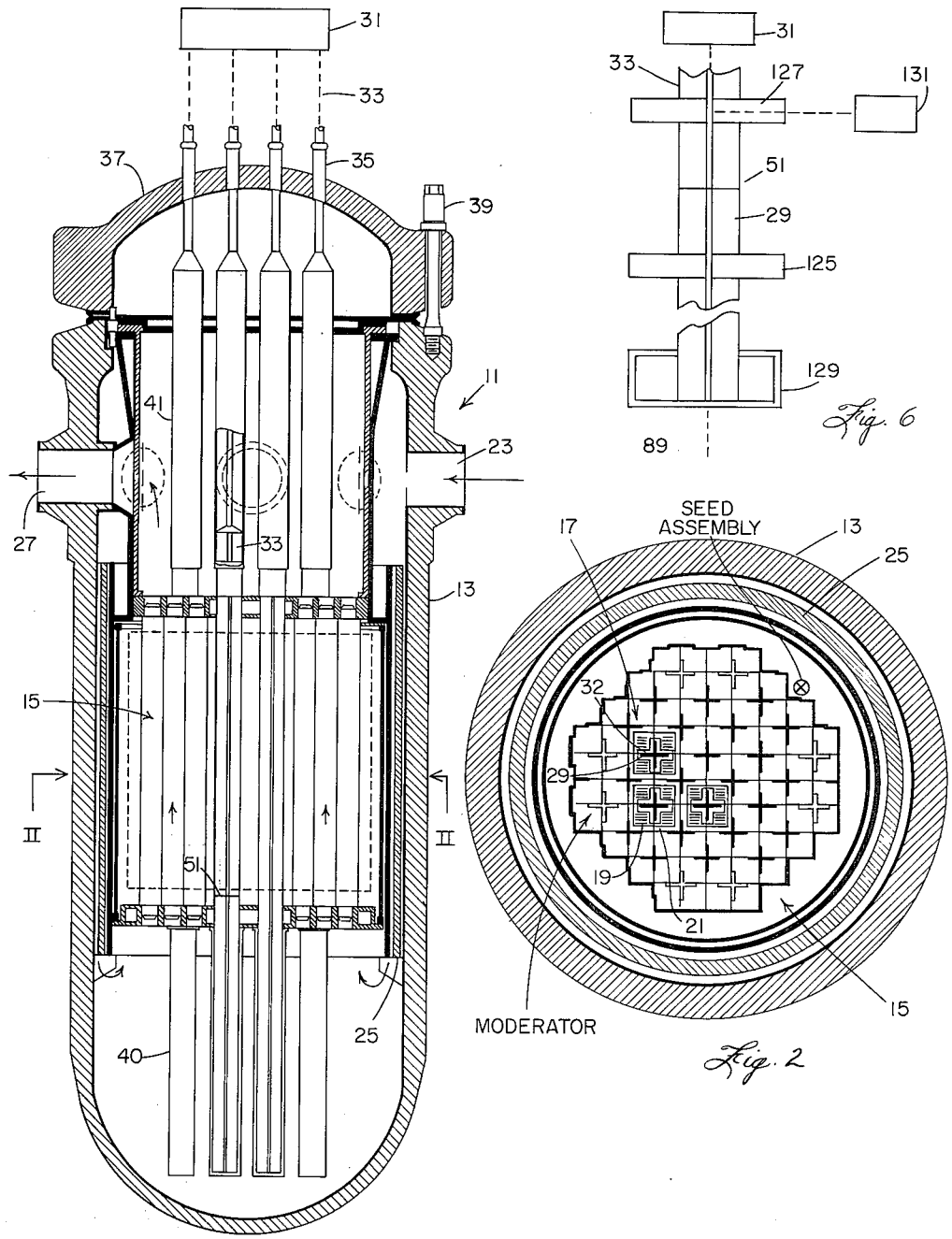

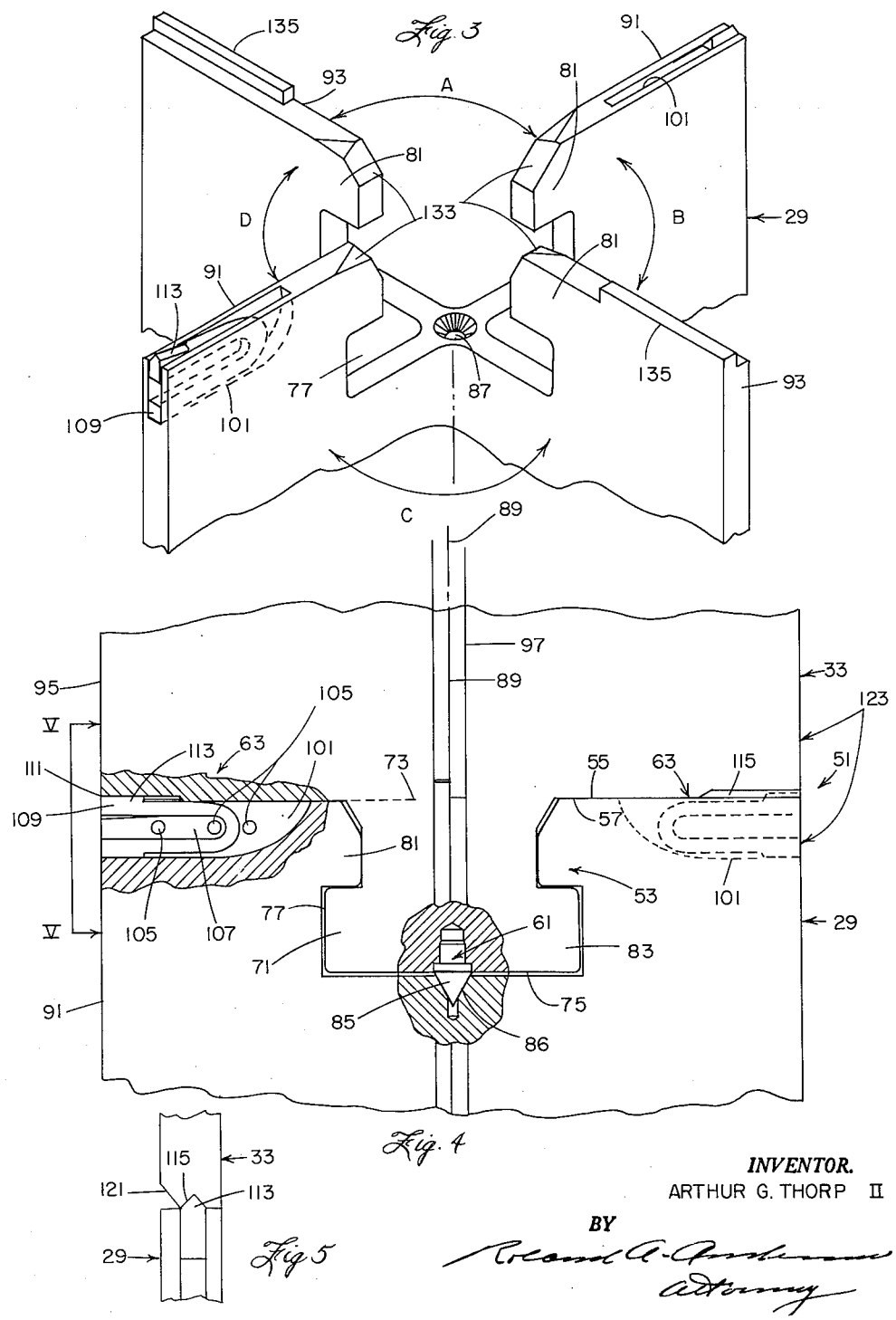

3,048,532
CRUCIFORM CONTROL ROD JOINT
Arthur G. Thorp II, Pittsburgh, Pa., assignor, by mesne assignments, to the United States of America as represented by the United States Atomic Energy Commission
Filed May 24, 1961, Ser. No. 112,478
5 Claims. (Cl. 204—193.2)

This invention relates to nuclear reactor components and more particularly to connections for nuclear reactor control rods.

Conventional nuclear power reactors, such as the one shown and described in "The Shippingport Pressurized Water Reactor" published by the Addison-Wesley Publishing Company, Inc. in 1958, have had cruciform control rods that have been movable in control channels in the reactor core to control the power level of the reactors. The rods have been made of relatively heavy material having a large capture or absorbing cross-section for thermal neutrons such as cadmium, boron steels or hafnium.

The control rods have been of vital importance in the start-up and shut-down of the reactors. When not in operation, the rods have been inserted so deeply into the reactor core that the multiplication factor has been far below unity. In order to start up the reactor, the control rods have been gradually withdrawn until the reactivity has been slightly positive, the reactor has been supercritical, the neutron flux has been increased and the multiplication factor has been slightly above unity. When the desired power level has been reached, the rods have been driven into the reactor core to a position to achieve a multiplication factor of unity, for example, a position corresponding to the position where $k_{eff}=1$ in accordance with the well-known nuclear reactor formula. Because the effective multiplication factor of the reactor changes from unity due to such continuing causes as the change in temperature of the reactor, the accumulation of fission products in the reactor and the burn-up of the reactor fuel, the control rods have been moved in and out of the reactor core at frequent intervals to maintain a constant power level. Heretofore long control rods and followers have been used wherein the followers have filled the slots in the reactor core vacated by the rods in order to minimize flux peaking in the fuel in that vicinity. The rods themselves have been burned up necessitating removal and replacement thereof from time to time.

Because they have been radioactive, the rods and followers have been handled remotely under water and since they have been heavy, their handling or disposal as a unit has been difficult and expensive. As an illustration, long handling carriages have been used for the rods and followers. It has been found that a joint between the control rods and control-rod followers permits a reduction in the size of the handling equipment and permits the use of handling carriages the length of the control rods. Moreover, reuseable control-rod followers are possible.

In accordance with this invention a joint is provided between a cruciform control rod member and a cruciform control rod follower member comprising an interlocking joint between the members, means for rotatably centering the members along a common axis, and resilient means that cooperate with the members simultaneously to align their crosses and selectively to restrain the members from relative opposite rotation.

The above and further novel features of this invention will appear more fully from the following detailed description when the same is read in connection with the accompanying drawings. It is to be expressly understood, however, that the drawings are not intended as a definition of the invention but are for the purpose of illustration only.

In the drawings where like parts are marked alike:
FIG. 1 is a vertical section of a nuclear reactor suitable for use with the invention;
FIG. 2 is a cross-section of FIG. 1 through II—II;
FIG. 3 is an isometric view of a control rod follower of FIGS. 1 and 2;
FIG. 4 is a partial elevation of the control rod follower of FIG. 3 attached to a control rod therefor;
FIG. 5 is an enlarged view of the abutting elements of FIG. 4 taken through V—V; and
FIG. 6 is a partial elevation of means for rotating the control rod and holding the follower of FIG. 4.

Referring now to FIG. 1, reactor 11 is a suitable reactor such as the pressurized light water cooled Yankee nuclear power reactor described in the "Directory of Nuclear Reactors" vol. 1, pp. 39–41 published by the International Atomic Energy Agency in 1959. A conventional pressure-tight outer pressure vessel 13 encloses a reactor core 15 which contains adjacent suitably lattice arrangement nuclear fuel element assemblies such as assemblies 17 (three of which are shown in FIG. 2 for ease of explanation), and fuel elements 19 forming passageways such as passageways 21 for the circulation of a cooling fluid or gas therethrough. The core also contains conventional source assemblies for initiating a nuclear reaction in the core and a conventional moderator around the fuel element assemblies which slows down the neutrons produced in the nuclear reaction sufficiently for the maintenance of a nuclear reaction in the core 15. As is well known, the nuclear reaction in the core 15 produces heat and this heat is removed from the reactor to a conventional power plant (not shown) by means of water under pressure that passes into the reactor through inlet 23 down along thermal shield 25, up through passageways 21 wherein the heat is added, and out outlet 27 to the power plant where the heat is converted to power. Thereupon the water cools and circulates back to inlet 23 by means of suitable pumps (not shown).

The core 15 also contains cruciform control rods 33 and followers 29 that move in and out of assemblies 17 to maintain the power level in the reactor 11 at a desired level as described above. Advantageously, the followers 29 may be relatively non-absorbing Zircaloy and have a life of two or more control rods such that they are reuseable. A suitable motor 31 raises and lowers the rods and followers in cruciform control rod channels 32, located for example in the assemblies 17, by means of cruciform rods 33 that are connected to the motor 31 by means including a rack and pinion arrangement (not shown) through seals 35 in a removable head 37 held on the top of the reactor by an annular array of bolts 39. Tubes 40 enclose the followers 29 at the bottom of the core and tubes 41 enclose the rods 33 at the top of the core. The rods 33 must be removed from core 15 and tubes 41 and replaced from time to time. Also, since the rods 33 become radioactive and are connected to the long reuseable followers 29, it is advantageous to have a simple, remotely operated joint for connecting and disconnecting the rods 33 from the followers 29. Since the rods 33 are heavy and subject to frequent manipulation in and out of the reactor core the joints must be durable. Since any failure of the joints could jam the rods and/or followers in the control rod channels 32, so as to make control of the reactor and removal of the rods and/or followers extremely difficult or dangerous, the operation of joints must be reliable. Additionally, the joint must align the cruciforms of the rods and the followers for free movement in and out of the control rod channels 32.

In accordance with this invention a durable, easily operated joint 51 is provided between the followers 29 and control rods 33, which has an interlocking means 53 at ends 57 of control rods 33 and adjacent ends 55 of followers 29 for hanging the followers from the control rods, means 61 for rotatably centering the followers and their control rods along a common axis, and means 63 for restraining the followers and their control rods from relative opposite rotation around the common axis and simultaneously aligning the crosses of the follower and control rod. For ease of explanation, the joint will be described principally with reference to one follower 29 and control rod 33 as shown in FIGURES 3, 4 and 5.

Interlocking means 53 comprises T-shaped extensions or T's 71 that are crossed at end 57 of rod 33 with the base 73 of the T's connected to the control rod 33, and the base of the T's and the cross-arms 75 of the T's fitting into cut-out portions 77 of the followers 29. This cut-out portion 77 corresponds in shape and size with the shape and size of extensions 71 so that fingers 81 of the follower 29 overlap fingers 83 of the control rod 33 as shown in FIGURES 3 and 4.

Centering means 61 comprises a pin 85 inserted in the cross-arm 75 of the T's 71 at the center outside thereof and has a cone-shaped bearing surface 86 that mates with a complementary cone-shaped recess 87 at the end 55 of follower 29. This pin surface 86 seats in recess 87 along a common axis 89 passing through the center of follower 29 and control rod 33 so that the follower and control rod rotate relatively around the axis 89 and the fingers 81 of the follower 29 rotate into and out of substantially full engagement with the fingers 83 of control rod 33. When the fingers engage each other the follower 29 can securely hang from the control rod 33 with the crosses thereof aligned in correspondence with each other and the follower and control rod interlocked against opposite longitudinal movement. The follower and control rod rotate relatively around axis 89 so that the arms 91 and 93 of the follower form 90° angles A, B, C and D that bisect like angles formed by arms 95 and 97 of the control rod. Then the fingers 81 and 83 disengage.

Means 63 restrains the follower 29 and control rod 33 from opposite relative rotation and aligns the crosses or arms thereof as shown in FIGURES 4 and 5. To this end the follower 29 has recesses 101 in opposite sides of its arm 91 at end 55 of the follower. Rivets 105 pass through the sides of the recesses so as to be flush with the outside thereof and they hold bars 107 in each of the recesses 101. Each bar holds a resilient C-shaped spring 109 that curves outwardly around the bar 107 so as to be held securely in recess 101 with the spring end 111 protruding from the top of the recess 101. This spring end 111 has a V-shaped portion or key 113 adapted to fit into mating V-shaped recesses 115 in opposite sides of arm 95 at end 57 of control rod 33. When the followers and control rods rotate to interlock their fingers 81 and 83, the V 113 of spring 109 contacts lead-in tapered portions 121 of rod arm 95 to compress the spring 109 and thereupon the spring becomes compressed in recesses 101 and 115 between follower 29 and control rod 33 so as to restrain the follower and control rod from relative opposite rotation and to align their crosses as shown in FIG. 4.

In operation a sequence will be described in which the reactor is operating, the reactor is shut down and a control rod is removed and replaced. During this operation, the motor 31 holds the control rods 33 in an intermediate position in the reactor so as to maintain the reactor at a desired power level. At this time the joint 51 is in the reactor core. By lowering the rods, the rods capture a sufficient number of neutrons to decrease the power level and to shut the reactor down. After shutdown of the reactor, the removal of cover 37 permits the raising of the seed assemblies or fuel assemblies, the control rods and the followers therefor, and the exposure of the joints 51. After such removal, raising, and exposure, a crane (not shown) moves the motor 31, the rods 33 and followers 29 to a location where one portion of the rod-follower assembly 123 is held and the other portion is rotated to disengage the rod from the follower. To this end the follower may be lowered into cruciform supports 125 and 127 onto a platform 129. Suitable fixtures hold the lower support 125 while a suitable drive 131 rotates the control rod 33 around axis 89. This depresses springs 109 into follower recesses 101, frees the keys 113 from rod recesses 115 and disengages the follower fingers 81 from the rod fingers 83. Thus the follower is reuseable and the control rod can easily be replaced at necessary intervals.

Thereupon the followers 29 are moved to seat its recess 87 with a pin bearing surface 86 of another rod 33 so that the arms 95 and 97 of that rod bisect the angles of the arms 91 and 93 of the follower. The support 127 then rotates to engage the follower fingers 81 with the control rod fingers 83, to seat the V's 113 under compression in the control rod recesses 115 thus to restrain the follower from turning relative to the abutting rod and to align the crosses of the follower and control rod for re-entry and free movement into the appropriate control rod channel 32. This connects the follower to the control rod. Optional tapered lead-in surfaces 133 on the fingers of follower 29 also help interlock the fingers of the follower and control rod and optional stops 135 on the fingers of the follower at one side of arms 93 stop the relative rotation of the follower and support in one direction after the follower and control rod are connected. The followers, control rods and the seed or fuel assemblies are reinserted in vessel 13, the cover 37 is replaced and the reactor 11 is started again in a conventional manner thus completing a sequence.

This invention provides a simple and reliable joint for a cruciform follower and control rod therefor that is easily and rapidly operated remotely. The joint has the advantage of selectively abutting the follower and control rod so as to restrain the follower and control rod from relative opposite rotation, simultaneously aligning the crosses of the follower and control rod for free movement in a control rod channel and securely hanging the follower from the control rod. Also the joint makes possible easier handling of the rod and follower, the reduction in size of the handling equipment, and the reuse of the followers.

I claim:

1. In a nuclear reactor having a cruciform control rod member and a cruciform control rod follower member adapted to move in a cruciform channel in said reactor, a joint for connecting said members in abutting relation, comprising a longitudinally extending cross-shaped control-rod member having first and second crossed arms and tapered receiving means at one end of at least one of said arms and crossed T-shaped sections extending longitudinally from said control-rod member adjacent said receiving means with the base of the T's at the center of the cross formed by said member, a control rod follower member having longitudinally extending third and fourth crossed arms formed with end slots that correspond in shape with and are adapted to mate with said T-shaped sections, means interposed between the center of the cross-arms of said T-shaped sections and the center of said slots at the center of the cross of said follower for rotatably centering the said members relative to each other so that said T-shaped sections rotate in said slots, said tapered receiving means being in the ends of said follower member adjacent said third arm, and means in said third arm having resilient V-shaped keys that are selectively adapted to be interposed under compression in said receiving means whereby the crosses of said members are selectively aligned in abutting relation with each other, said members are selectively stopped from relative opposite rotation, and mating portions of said T-shaped sections and said control rod forming said slots will selectively cause said follower to hang securely from said control-rod member and to move freely in the cruciform control rod channel in said reactor.

2. In a nuclear reactor having a cruciform control rod member and a cruciform control rod follower member, a joint for connecting said members in abutting relation, comprising interfitting crossed arms at adjacent ends of said members for selectively interlocking the ends of said members in abutting relation against relative opposite longitudinal movement, means for coaxially aligning the centers of said cruciforms along a common axis so that said members are relatively rotatable in opposite directions around said axis, and resilient means interposed under compression between the abutting ends of said members so as selectively to restrain said members from relative opposite rotation around said common axis when said cruciforms coincide.

3. In a nuclear reactor having a cruciform control rod member and a cruciform control rod follower member, a joint for connecting said members in abutting relation, comprising interfitting crossed arms at adjacent ends of said members for selectively interlocking the ends of said members in abutting relation against relative opposite longitudinal movement, means for coaxially aligning the centers of said cruciforms along a common axis so that said members are relatively rotatable in opposite directions around said common axis, said members having arms that form corresponding crosses, and resilient means fixed in at least one arm of one of said members which is compressed when said crosses correspond whereby said compression selectively restrains said members from relative opposite rotation around said common axis when said crosses correspond.

4. In a nuclear reactor having a cruciform control rod member and a cruciform control rod follower member, a joint for connecting said members in abutting relation, comprising interfitting crossed arms at adjacent ends of said members that selectively interlock the ends of said members against relative opposite longitudinal movement, means interposed between said arms along the center of said cruciforms for aligning said cruciforms along a common axis so that said members rotate relatively in opposite directions around said axis, said supporting member having crossed arms with V-shaped grooves in at least one of said arms, said control rod member having arms that form a cross that corresponds with the cross of said supporting member, resilient keys that are fixed in at least one arm of said control rod member and are adapted to mate with said grooves in said follower member, and means for selectively compressing said keys in said grooves between the adjacent ends of said members whereby said members are selectively stopped from relative opposite rotation around said axis and said cruciforms are made to coincide.

5. A joint for a control rod member having arms that form a cross and a control follower member having arms that form a cross, comprising means for centering the arms of said rod so as to bisect the four angles formed by the arms of said follower, interlocking means at adjacent ends of said members that are adapted to rotate into overlapping engagement so as to prevent relative opposite longitudinal movement between the said members, receiving means in the arms of said rod, and resilient keys that are selectively depressable in the arms of said follower by said rod and simultaneously compressable into mating engagement with said receiving means of said rod when the angles formed by said arms correspond whereby said members are selectively restrained from relative opposite rotation.

References Cited in the file of this patent

UNITED STATES PATENTS 2,857,324  De Boisblanc et al. _____ Oct. 21, 1958

OTHER REFERENCES

"Directory of Nuclear Reactors," vol. I, pages 39–42. International Atomic Energy Agency, 1959.